United States Patent [19]

Speiser et al.

[11] 3,860,892

[45] Jan. 14, 1975

[54] CASCADE TRANSVERSAL FILTER AMPLITUDE-COMPENSATION NETWORK

[75] Inventors: Jeffrey M. Speiser; George W. Byram, both of San Diego, Calif.

[73] Assignee: The United States of America as represented by the Secretary of the Navy

[22] Filed: Feb. 25, 1974

[21] Appl. No.: 445,366

[52] U.S. Cl. .............................. 333/70 T, 333/28 R

[51] Int. Cl. .......................... H03h 7/28, H03h 7/30

[58] Field of Search .................. 333/18, 28 R, 70 T; 325/42, 65

[56] References Cited

UNITED STATES PATENTS 3,727,153 4/1973 McAuliffe ............................ 333/18

*Primary Examiner*—Eli Lieberman

*Assistant Examiner*—Marvin Nussbaum

*Attorney, Agent, or Firm*—Richard S. Sciascia; Ervin F. Johnston; John Stan

[57] ABSTRACT

This invention relates to an amplitude-compensation network consisting of a cascaded series of N transversal filters, each transversal filter of the network having a specified transfer function, $H_1(f), H_2(f), \ldots, H_N(f)$ where $H_k(f)=e^{Q_k \cos 2\pi kfd}$, and where $Q_k$ is a constant and $d^{-1}$ is the period. The tap weights for each filter are derived from the relationship $g_m = I_m(q)$ when $q$ is positive and $g_m = (-1)^m I_m(-q)$, if $q$ is negative. Here, $I_m$ denotes the modified Bessel function of the first kind and $q$ is a constant for the kth filter $q = Q_k$.

2 Claims, 4 Drawing Figures

IMPLEMENTATION OF A CASCADE TRANSVERSAL FILTER AMPLITUDE-COMPENSATION NETWORK

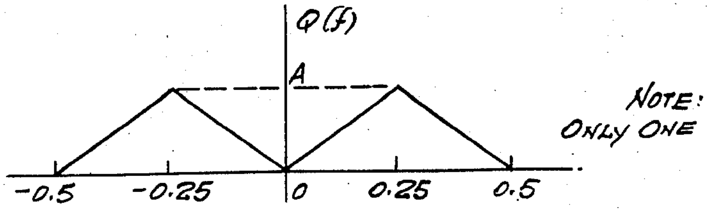
NOTE: ONLY ONE PERIOD IS SHOWN.
FIG. 1A.
ARBITRARILY CHOSEN FUNCTION, Q(f) = LOG | H(f) |
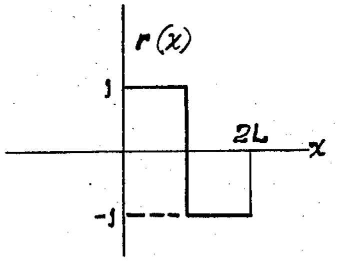
NOTE: ONLY ONE PERIOD IS SHOWN.
FIG. 1B.
GRAPH USED TO DETERMINE THE FOURIER COSINE SERIES FOR THE FUNCTION Q(f) OF FIG. 1A.
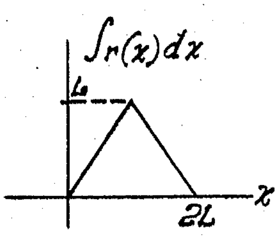
NOTE: ONLY ONE PERIOD IS SHOWN.
FIG. 1C.
INTEGRAL OF THE CURVE OF FIG. 1B.
FIG. 1.
STAGES IN THE DETERMINATION OF THE TRANSFER FUNCTION OF AN ARBITRARILY CHOSEN FUNCTION.

IMPLEMENTATION OF A CASCADE TRANSVERSAL FILTER AMPLITUDE-COMPENSATION NETWORK.

CASCADE TRANSVERSAL FILTER AMPLITUDE-COMPENSATION NETWORK

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a simple implementation of a general linear filter with zero phase shift, or phase shift varying lineraly with frequency, corresponding to an implementation delay, and specified attenuation as a function of frequency. Such filters may be combined with other filters of a network to allow for the design of a transversal filter cascade having specified transfer function, where the amplitude characteristic may be completely specified, and the phase function may be specified apart from a linear trend or phase.

The amplitude-compensation network of this invention is useful for a large class of problems where a filter must be designed to close specifications. A typical example would be a compensating network to correct the transfer function of an existing network or transducer. This requirement may occur in signal processing applications, where, for example, it may be necessary to compensate for the distortions introduced by an existing transducer.

The prior art techniques for accomplishing the results of this invention generally fall into three categories: (1) lumped network synthesis; (2) resonant structures; and (3) single transversal filters.

Designing a linear filter to have a specified attenuation function and linear phase shift using lumped network design techniques or resonant structures is quite difficult, particularly if the transfer function desired is complicated in structure.

The single transversal filter provides a more flexible method of synthesis, but the attainable time-bandwidth product (or equivalent number of independent taps) is limited, and the design is straightforward only if the filter has been specified in the time domain. Such a specification is awkward if it is desired to build a compensating network for a lumped network, sonar transducer, or other linear system whose response is usually specified by its transfer function.

In a previously filed application entitled, "Cascade Transversal Filter Phase-Compensation Network," filed on Oct. 15, 1973 and having the Ser. No. 406,720, and now U.S. Pat. No. 3,829,798, there are shown two figures, FIGS. 4 and 5, which closely resemble FIG. 2 of this invention.

The kind of tap weights used in the two inventions, this one and one just described, are derived from two different kinds of functions. If the two functions are looked upon as the functions of a real variable, then they are totally different. If they are looked upon as functions in the complex plane, they they are not completely different.

If the original desired transfer function is looked upon as an exponential of the form $e^{a+ib}$, the $e^a$ part of the exponential gives rise to the amplitude filters and the $e^{ib}$ part gives rise to the phase filters. In the one case $J_n(x)$ Bessel functions are used and in the other case the $I_n(x)$ Bessel functions are used. These Bessel functions are related, in that considering the Bessel function of a complex argument, if the whole function be rotated by 90° in the complex plane, one would obtain the other type of Bessel function.

SUMMARY OF THE INVENTION

This invention relates to an amplitude-compensation network, with zero phase shift or phase shift varying linearly with frequency, and specified attenuation as a function of frequency, comprising a cascaded combination of simple transversal filters, including an input transversal filter connectable to an input signal, the combination having transfer functions $H_1(f)$, $H_2(f)$, . . . , $H_N(f)$, where each of the terms $H_n(f)$ is defined by the equation $$H(f)=e^{Q(f)}=e^{\sum_{k=0}^{\infty} Q_k \cos 2\pi kfd},$$

where $k=1, 2, \ldots$, and $d^{-1}$ is the period of H($f$). Each transversal filter comprises a plurality of tapped, weighted, elements, the tap weightings being determined from the relationship, $$g_m = \begin{cases} I_m(q), \text{ if } q \text{ is positive} \\ (-1)^m I_m(-q), \text{ if } q \text{ is negative} \end{cases}$$

where $I_m$ denotes the mth modified Bessel function of the first kind and $q$ is a constant. In general, the cascaded transversal filters have a tap spacing of $d$, beginning with the input transversal filter, and have a tap spacing of $nd$, $n=1, 2, 3, \ldots$, for successive transversal filters in the cascade. The network includes a plurality of signal summers, one for each transversal filter, the inputs to each signal summer being the outputs of the tapped, weighted, elements of the delay line of the associated transversal filter, the output of the last signal summer being the output of the amplitude-compensation network.

OBJECTS OF THE INVENTION

An object of the invention is to provide an amplitude-compensation network which is fairly easy to implement, even if the transfer function desired is complicated in structure.

Another object of the invention is to provide an amplitude-compensation network suitable for use where a filter must be designed to close specifications.

Yet another object of the invention is to provide a network which has a greater time-bandwidth product than prior art single transversal filters used for the same purpose.

Other objects, advantages and novel features of the invention will become apparent from the following detailed description of the invention, when considered in conjunction with the accompanying drawings, wherein:

BRIEF DESCRIPTION OF THE DRAWINGS

FIGS. 1A, 1B and 1C, are a set of graphs showing three steps in the determination of the transfer function of an arbitrarily chosen function, namely $Q(f)$ = Log $|H(f)|$.

DESCRIPTION OF THE PREFERRED EMBODIMENTS

Figure 2:
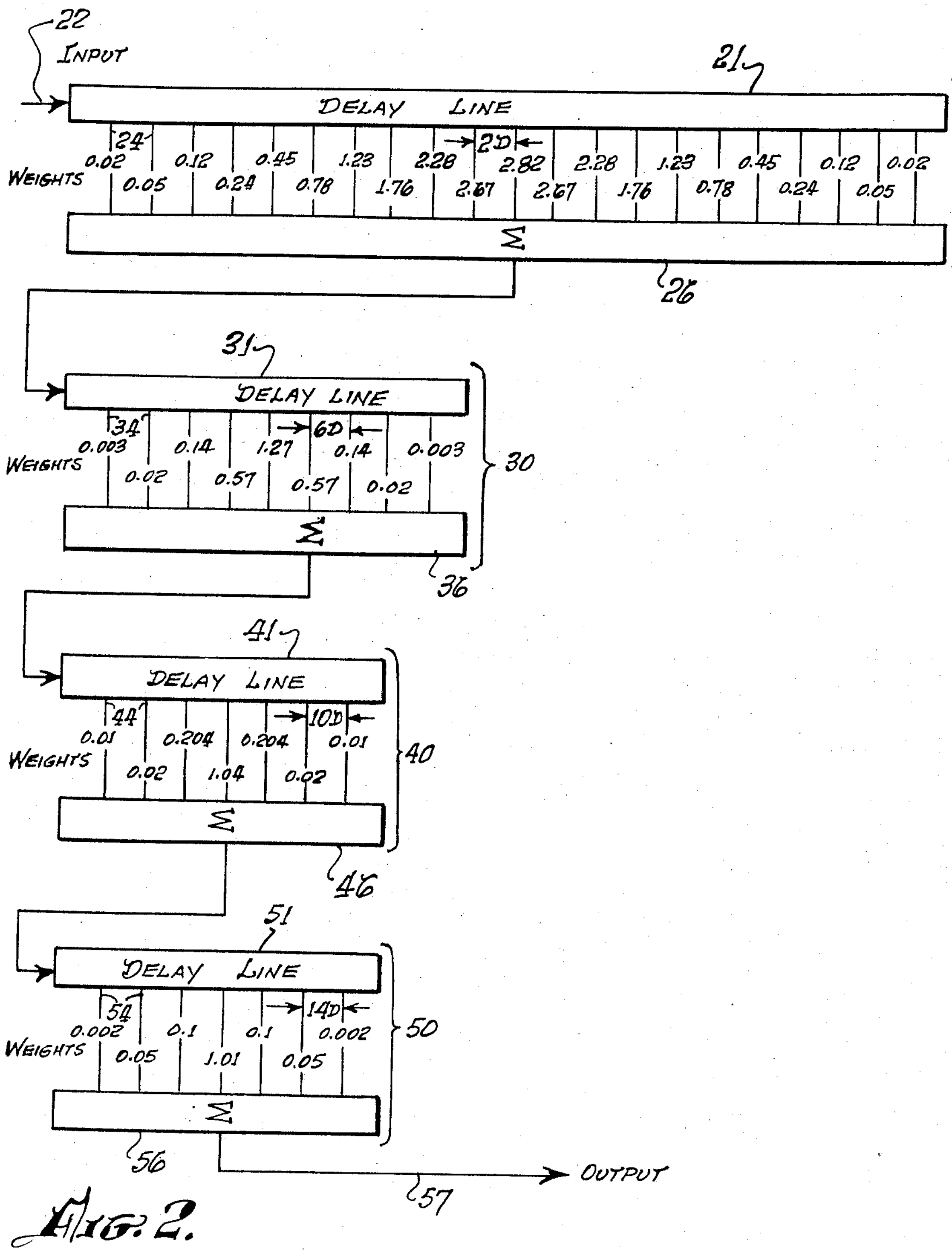
FIG. 2 is a schematic diagram showing an implementation of a cascaded transversal filter amplitude-compensation network designed according to the invention.

The mathematics involved will be discussed in detail, preparatory to the discussion of a preferred embodiment.

Let the desired transfer function of the network to be designed be $$H(f) = e^{Q(f)}, \tag{1}$$

where Q(f) is real. First suppose that the filter may be realized (in principle) by a single transversal filter with tap spacing $d$, and impulse response $$h(t) = \sum_k h_k \delta(t-kd), \tag{2}$$

where $\delta(t)$ is the Dirac delta function. The corresponding transfer function is $$H(f) = \int e^{-i2\pi ft} h(t)\,dt = \sum_k h_k e^{-i2\pi fkd} \tag{3}$$

which is a periodic function of frequency, with period $d^{-1}$. Since $h(t)$ is real, $$H(-f) = H^*(f), \tag{4}$$

where the asterisk denotes complex conjugation. This in turn requires that $Q(f)$ be an even function of frequency. Since $Q(f)$ is even and periodic, it may be expanded in a Fourier cosine series:

$$Q(f) = \Sigma\, Q_k \cos 2\pi kfd. \tag{5}$$

For many attenuation functions of interest, it suffices to use a very few terms in the cosine series expansion, say $$Q(f) = \sum_{k=1}^{N} Q_k \cos 2\pi kfd \tag{6}$$

The term corresponding to $k = 0$ has been dropped, since it corresponds to a constant attenuation, independent of frequency, and may be provided by an attenuator or amplifier external to the filter.

$$H(f) = e^{Q(f)} \sum_{k=1}^{N} e^{Q_k \cos 2\pi kfd} \tag{7}$$

The above representation corresponds to a cascade of filters with transfer functions $H_1(f)$, $H_2(f)$, . . . , $H_N(f)$, where $$H_k(f) = e^{Q_k \cos 2\pi kfd} \tag{8}$$

The network design is completed by specifying the transversal filter tap weights corresponding to each of the cascaded filters.

First, it will be noticed that it is only necessary to examine the case $k = 1$, since compressing a Fourier transform by a factor of $k$ merely expands the time function by the same factor.

The general transfer function that must be considered is therefore $$G(f) = e^{q \cos 2\pi f}, \tag{9}$$

where $q$ here denotes a real constant which may be positive or negative. Since $G(f)$ is periodic, it may be expanded in a complex Fourier series:

$$G(f) = \sum_m g_m e^{-i2\pi mf} \tag{10}$$

where $$g_m = \int_0^1 e^{i2\pi mf} G(f)\,df \tag{11}$$

$G(f)$ is thus the transfer function of a transversal filter with impulse response $$g(t) = \sum_m g_m \delta(t-m) \tag{12}$$

It will be shown hereinbelow that the tap weights are $$g_m = i^m J_m(iq), \tag{13}$$

where $J_m$ denotes the mth Bessel function of the first kind.

In terms of more conveniently tabulated functions, the tap weights are:

$$g_m = \begin{cases} I_m(|q|), \text{ if q is positive} & (14) \\ (-1)^m I_m(|q|), \text{ if q is negative} & (15) \end{cases}$$

The tap weights are derived as follows: Substituting the value for $G(f)$ from Eq. (9) into Eq. (11), there is obtained $$g_m = \int_0^1 e^{i2\pi mf} e^{q \cos 2\pi f}\,df \tag{16}$$

Changing the variable into a more convenient form, let $$u = f + 0.25,\ f = u - 0.25,\ df = du \tag{17}$$

Then Eq. (16) becomes $$g_m = \int_{0.25}^{1.25} e^{i2\pi m(u-0.25)} e^{q \cos 2\pi(u-0.25)}\,du \tag{18}$$

$$= e^{-0.5\pi mi} \int_{0.25}^{1.25} e^{i2\pi mu + q \sin 2\pi u}\,du \tag{19}$$

$$\text{Let } v = 2\pi u,\ u = (2\pi)^{-1} v,\ du = (2\pi)^{-1} dv \tag{20}$$

Eq. (19) now becomes $$g_m = e^{-0.5\pi mi} \int_{0.5\pi}^{2.5\pi} e^{i(mv - iQ \sin v)} (2\pi)^{-1} dv \tag{21}$$

$$g_m = i^{-m} J_m(iq) \tag{22}$$

where the following identities have been used:

$$J_n(z) = (2\pi)^{-1} \int_a^{2\pi+a} e^{i(nv - z \sin v)} dv \tag{23}$$

and $$e^{i\pi/2} = i \tag{24}$$

It is also well known that for $z$ real and positive, $$I_m(z) = i^{-m} J_m(iz) = (-i)^m J_m(-iz) \tag{25}$$

Therefore, if $q$ is positive, $g_m = I_m(q)$ (26)

If $q$ is negative, let $R = |q|$, (27)

$$I_m(R) = (-i)^m J_m(-iR) = (-1)^m i^m J_m(-iR) \tag{28}$$

or $$g_m = i^m J_m(-iR) = (-1)^m I_m(R) \tag{29}$$

To summarize, the tap weights are:

$$g_m = \begin{cases} I_m(q), \text{ if } q \text{ is positive} & (30) \\ (-1)^m I_m(-q), \text{ if } q \text{ is negative} & (31) \end{cases}$$

Let the desired transfer function be specified in terms of the logarithmic gain $$Q(f) = \log |H(f)|. \tag{32}$$

The graph of this function is shown in FIG. 1A.

To find the Fourier cosine series for $Q(f)$, one can start with the Fourier sine series for a square wave, as is shown in FIG. 1B, wherein the square wave $x(x)$ is defined in terms of its parameters.

$$r(x) = 4(\pi)^{-1} \sum_{n=1, 3, 5 \ldots} n^{-1} \sin (n\pi x L^{-1}) \tag{33}$$

Integrating $r(x)$, there is obtained:

$$\int_0^x r(x)dx = -4(\pi)^{-1} \sum_{n=1, 3, 5 \ldots} n^{-1} L(n\pi)^{-1} \cos (n\pi x L^{-1})$$

$$= -4L(\pi)^{-2} \sum_{n=1, 3, 5 \ldots} n^{-2} \cos (n\pi x L^{-1}) \tag{34}$$

The example given corresponds to $$2L = 0.5, \text{ or } L = 0.25 \tag{35}$$

therefore $$Q(f) = -A(\pi)^{-2} \sum_{n=1, 3, 5 \ldots} n^{-2} \cos (4n\pi f) \tag{36}$$

But $$Q(f) = \sum_{k=0}^{\infty} Q_k \cos (2\pi k f) \tag{37}$$

Identifying the corresponding terms in the two series, the significant coefficients are obtained:

| n | k | $Q_k$ | | | |
|---|---|---|---|---|---|
| 1 | 2 | $-A(\pi)^{-2}$ | = | −0.101 A | (approximately) |
| 3 | 6 | $-A(9\pi^2)^{-1}$ | = | −0.011 A | (approximately) |
| 5 | 10 | $-A(25\pi^2)^{-1}$ | = | −0.004 A | (approximately) |
| 7 | 14 | $-A(49\pi^2)^{-1}$ | = | −0.002 A | (approximately) |

To make the example simple, let $A = -100$. The values from the above table then become:

| k | $q_k$ |
|---|---|
| 2 | 10.1 |
| 6 | 1.1 |
| 10 | 0.4 |
| 14 | 0.2 |

| | for k=2 | | for k=6 | | for k=10 | | for k=14 |
|---|---|---|---|---|---|---|---|
| n | $I_n(10)$ | n | $I_n(1)$ | n | $I_n(.4)$ | n | $I_n(.2)$ |
| 0 | $2.8 \times 10^3$ | 0 | 1.27 | 0 | 1.04 | 0 | 1.01 |
| 1 | $2.67 \times 10^3$ | 1 | 0.57 | 1 | 0.204 | 1 | 0.1 |
| 2 | $2.28 \times 10^3$ | 2 | 0.14 | 2 | 0.02 | 2 | 0.05 |
| 3 | $1.76 \times 10^3$ | 3 | 0.02 | 3 | 0.01 | 3 | 0.002 |
| 4 | $1.23 \times 10^3$ | 4 | 0.003 | | | | |
| 5 | $0.78 \times 10^3$ | | | | | | |
| 6 | $0.45 \times 10^3$ | | | | | | |
| 7 | $0.24 \times 10^3$ | | | | | | |
| 8 | $0.12 \times 10^3$ | | | | | | |
| 9 | $0.05 \times 10^3$ | | | | | | |
| 10 | $0.02 \times 10^3$ | | | | | | |

The tap weights of negative index are found by using the identity $$I_{-n}(x) = I_n(x). \tag{38}$$

It is to be noted that all of the taps in any given transversal filter may be scaled by the same constant factor, so the factor of $10^3$ in $I_n(10)$ does not present any difficulties with regard to the dynamic range required in setting the tap weights.

Referring now to FIG. 2, which illustrates a network whose parameters have just been calculated and tabulated, therein is shown an amplitude-compensation network 10, with zero phase shift or phase shift varying linearly with frequency, and specified attenuation as a function of frequency, comprising a cascaded combination of simple transversal filters, 20, 30, 40 and 50, including an input transversal filter 20 connectable to an input signal at input 22, the filters of the combination having transfer functions $H_1(f), H_2(f), \ldots, H_N(f)$, where each of the terms $H_n(f)$ is defined by the equation $H(f) = e^{Q(f)} = e^{Q_k \cos 2\pi kfd}$, where $k = 1, 2, \ldots,$ and $d^{-1}$ is the period of $H(f)$. Each transversal filter, 20, 30, 40 and 50, comprises a plurality of tapped, weighted, elements, 24, 34, 44 and 54, the tap weightings being determined from the relationship, $$G_M = \begin{cases} I_m(q), \text{ if q is positive} & (39) \\ (-1)^m I_m(-q), \text{ if q is negative}, & (40) \end{cases}$$

where $I_m(z)$ denotes the mth modified Bessel function of the first kind and $q$ is a constant.

Generally speaking, the cascaded transversal filters 20, 30, 40 and 50 have a tap spacing of d, beginning with the input transversal filter, 20 and a tap spacing of $nd$, $n = 1, 2, 3, \ldots$, for successive transversal filters in the cascade.

In the particular Fourier series expansion that was obtained, $n$ runs from 1 to 3, 5, etc, omitting the even numbers. In other implementations, n will have even and odd values. For the specific function used, $k = 2n$, and $n = 1, 3, 5, 7$ and so on, thereby obtaining the even values 2, 6, 10, 14, etc.

This relationship will not hold in general. In this particular case, this particular function expanded in such a manner, so that both the orders that appear and the constants that have to be used will depend upon the particular function.

Referring back to FIG. 2, the network 10 also includes a plurality of signal summers, 26, 36, 46 and 56, one for each transversal filter, 20, 30, 40 and 50, the inputs to each signal summer being the outputs of the tapped, weighted, elements of the delay line, 21, 31, 41 or 51, of the associated transversal filter. The output of the last signal summer 56 constitutes the output 57 of the amplitude-compensation network 10.

One advantage of the invention resides in the fact that complicated transfer functions may be synthesized accurately in a straightforward manner. The number of filters and the number of taps required per filter is small if it is desired to synthesize a transfer function with small dynamic range — as would be the case when correcting the small residual errors in an existing linear network or linear system.

Another advantage arises in that only one cascaded filter is required per ripple order which it is desired to control. In many cases the dynamic range required in the tap weights will be much less than the tap weight dynamic range required for an equivalent single transversal filter.

For alternative embodiments, any transversal filter implementation may be used for the individual filters to be cascaded.

If the particular implementation allows more independent taps per transversal filter than is required for each of the cascaded filters, then groups of the filters may be replaced by single filters whose impulse response (or tap weight function) is the convolution of the individual impulse responses in the group.

Obviously many modifications and variations of the present invention are possible in the light of the above teachings. It is therefore to be understood that within the scope of the appended claims the invention may be practiced otherwise than as specifically described.

What is claimed is:

1. An amplitude-compensating network, with zero phase shift or shift varying linearly with frequency, and specified attenuation as a function of frequency, comprising:

a cascaded combination of simple transversal filters, including an input transversal filter connectable to an input signal, the filters of the combination having transfer functions from input to output, of $H_1(f)$, $H_2(f)$, . . . , $H_N(f)$, where each of the terms $H_n(f)$ is defined by the equation $$H(f) = e^{Q(f)} = e^{\sum_{k=0}^{\infty} Q_k \cos 2\pi kfd},$$

where $k = 1, 2, \ldots$, and $d^{-1}$ is the period of $H(f)$; each transversal filter comprising:

a plurality of tapped, weighted elements, the tap weightings being determined from the relationship, $$g_m = \begin{cases} I_m(q), \text{ if q is positive} \\ (-1)^m I_m(-q), \text{ if q is negative} \end{cases}$$

where $I_m$ denotes the mth modified Bessel function of the first kind and q is a constant equal to $Q_k$ for the kth filter;

the cascaded transversal filters having a tap spacing of d, beginning with the input transversal filter, and having a tap spacing of $nd$, $n = 1, 2, 3, \ldots$, for successive transversal filters in the cascade;

a plurality of signal summers, one for each transversal filter, the inputs to each signal summer being the outputs of the tapped, weighted, elements of the delay line of the the associated transversal filter;

the output of the last signal summer, associated with the last delay line, the one in the cascade furthest removed from the input delay line, being the output of the amplitude-compensation network.

2. The amplitude-compensation network according to claim 1, wherein the network corresponds to the implementation of the function $Q(f) = \log |H(f)|$.

* * * * *